United States Patent [19]
Maltsev et al.

[11] Patent Number: 5,987,192
[45] Date of Patent: Nov. 16, 1999

[54] METHOD AND APPARATUS FOR PROCESSING OR RESIZING DIGITAL IMAGES, SUCH AS IMAGES OF BAR CODE SYMBOLS

[75] Inventors: Pavel A. Maltsev, Edmonds; Ken Coffman, Mount Vernon, both of Wash.

[73] Assignee: Intermec IP Corporation, Beverly Hills, Calif.

[21] Appl. No.: 08/932,873

[22] Filed: Sep. 18, 1997

[51] Int. Cl.[6] .................................................. G06K 9/32
[52] U.S. Cl. .......................... 382/298; 382/205; 382/237; 382/299; 382/318
[58] Field of Search .................................... 382/298, 299, 382/300, 176, 205, 237, 282, 318, 319; 235/462; 358/451

[56] References Cited

U.S. PATENT DOCUMENTS

| | | | |
|---|---|---|---|
| 4,656,664 | 4/1987 | Anderson et al. | 382/298 |
| 4,712,140 | 12/1987 | Mintzer et al. | 382/298 |
| 4,912,567 | 3/1990 | Nakajima et al. | 358/451 |
| 5,097,518 | 3/1992 | Scott et al. | 382/298 |
| 5,138,672 | 8/1992 | Hirabayashi et al. | 382/264 |
| 5,535,018 | 7/1996 | Yamano et al. | 358/444 |
| 5,561,617 | 10/1996 | van der Wal | 364/724.05 |
| 5,701,365 | 12/1997 | Harrington et al. | 358/451 |

OTHER PUBLICATIONS

R. Keys, "Cubic Convolution Interpolation for Digital Image Processing," *IEEE Transactions on Acoustics, Speech, and Signal Processing*, ASSP–29:6, pp. 1153–1160, Dec. 1981.

S. Park and R. Schowengerdt, "Image Reconstruction by Parametric Cubic Convolution," *Computer Vision, Graphics, and Image Processing 23*, pp. 258–272, 1983.

L. Koskinen, J. Astola, and Y. Neuvo, "Soft Morphological Filters," in *Proc. SPIE Symp on Image Algebra and Morphological Image Processing II*, San Diego, CA, pp. 262–270, Jul. 1991.

L. Koskinen and J. Astola, "Statistical properties of soft morphological filters," in *Proc. SPIE vol. 1658 Nonlinear Image Processing III*, pp. 25–36, 1992.

P. Kuosmanen, L. Koskinen, and J. Astola, "An Adaptive Morphological Filtering Method," *Proc. EUSIPCO–92*, 4 pp., Brussels, Belgium, Aug. 1992.

P. Kuosmanen, L. Koskinen, and J. Astola, "The Connection between Generalized Soft Morphological Operations and Stack Filters," Academic Dissertation, Acta Universitatis Tamperensis, Ser. A, vol. 362, Tampere, Finland, 6 pp., 1993.

P. Maltsev, "Soft morphological filters and hierarchical discrete transformations," in *Proc. SPIE vol. 2180 Nonlinear Image Processing V*, San Jose, CA, pp. 175–184, Feb. 1994.

*Primary Examiner*—Jose L. Couso
*Assistant Examiner*—Gregory Desire
*Attorney, Agent, or Firm*—Seed and Berry LLP

[57] ABSTRACT

A method and apparatus for resizing or processing images initially retrieves a one-dimensional sample of the image, such as a line of pixels. The image can be of a machine-readable symbol, or other data. A moving window having, for example, five pixels, includes a center "hard core" and four surrounding pixels. Two or more structural sets or multisets are applied to the window to produce a set of pixels greater than the set of pixels in the original image. For example, the center pixel is repeated three times, while immediately adjacent left and right pixels are repeated twice. Thus, a series of nine pixels results. The resulting nine pixels are then sorted based on descending gray scale levels. The n-th largest pixels is selected, such as the third largest. The image is updated, the window moved, and the method repeats again. Pyramid filtering, cubic convolution interpolation, or other techniques can be used to reduce the size of an image, and more complex windows and structural sets can be employed.

34 Claims, 5 Drawing Sheets

METHOD AND APPARATUS FOR PROCESSING OR RESIZING DIGITAL IMAGES, SUCH AS IMAGES OF BAR CODE SYMBOLS

TECHNICAL FIELD

The present invention relates to a method and apparatus for resizing images, including images of machine-readable symbols and text.

BACKGROUND OF THE INVENTION

There are numerous applications for processing video or digital images. Such images typically include noise that must be filtered from the image. Some noise is generated when altering the size of an image. Enlarging or expanding an image typically involves repeating pixels in a sampled image. Expanding the dimensional format or size of a video image typically does not involve many problems. However, reducing the size of an image often induces noise such as aliasing frequencies which are added to the synthesized, reduced image. For example, lines as artifacts can be created within an image by resampling the image. Prior techniques for eliminating such aliasing frequencies include finite impulse response (FIR) and infinite impulse response (IIR) filtering to remove this noise. A problem with such filtering techniques are that they are less than optimally effective or require significant processing time.

One solution for reducing errors or noise in image resizing involves interpolation. As is known, interpolation is the process of estimating the intermediate values of a continuous event from discrete samples, such as discrete pixels in a digital image. Interpolation has been used to magnify or reduce digital images. In a monochrome image having a discrete number of gray level values, interpolation introduces new gray level values. Such new gray level values are not present in the original image, and thus the resulting, resized image is distorted from the original image.

Another solution for reducing errors or noise in images involves mathematical morphology. Morphological methods manipulate the shapes in the original image. However, the ability to separate and manipulate different shapes causes morphological methods to be highly sensitive to noise or defects in the original image. Prior solutions prefilter the original image to remove noise. However, such prefiltering may distort the shapes of the original image, thereby degrading the performance of such morphological methods.

Improved solutions for reducing errors or noise in images, known as "soft" morphological methods, perform well in noisy conditions, but maintain much of the desirable standard morphological properties. Soft morphological methods are described, for example, in L. Koskinen et al. "Soft Morphological Filters," *SPIE Proceedings*, Vol. 1568, 262–270, and P. Maltsev, "Soft Morphological Filters and Hierarchical Discrete Transformations," *SPIE Proceedings*, Vol. 2180, 175–184. Typical or discrete morphological filters process signals as sets of points or values based on local maximum and minimum operations. Under discrete morphological filtering, such maximum and minimums are replaced by more general weighted order statistics, and "erosion" (or "dilation") of a function F by a set B at any point x is obtained by shifting the set B to x and taking the minimum (or maximum) of F inside the shifted set. In contrast the soft erosion and soft dilation in soft morphological operations replace maximum and minimums with more general weighted ordered statistics.

A key idea of soft morphological filters is that a structuring set or "multiset" (defined below) is divided into two parts: a "hard center" that behaves like an ordinary structuring set, and a "soft boundary" where maximum or minimum values are replaced by other order statistics. As a result, soft morphological filters behave more sensibly in noisy conditions and make the filters more tolerant to small variations in the shapes of objects in the filtered image.

Mathematically, soft morphological operations are naturally defined under a framework of weighted order statistics. First, we let A and B be finite convex sets of $Z^k$ and K be a natural number (e.g., k=2) such that $A \subset B$ and $1 \leq k \leq \min\{|B|/2, |B-A|\}$. For $x \in Z^2$ we denote the "translated set" by $S_x$, that is $$S_x = \{x+s : s \in S\},$$

which is a collection of objects, such as integers, where repetition allowed in a set is called a multiset, e.g., $\{1,2,3\}$ is a set and $\{1,1,2,3,3,3\}$ is a multiset. We denote the repetition operation by $\nabla$, that $$k \nabla X = \overset{k\ times}{\overline{X, \cdots, X}}.$$

For example $\{2\nabla 1, 2, 3\nabla 3\} = \{1, 1, 2, 3, 3, 3\}$.

The basic soft morphological operations are soft dilation and soft erosion, which are defined as follows.

Soft Dilation: Let f: $Z^k \Rightarrow Z+$ be a signal and $S_{pyr}=[B, (A1,r1), (A2, r2), \ldots, (An,m)]$ a hierarchical structuring system. The soft dilation of the signal f by a hierarchical structuring system $S_{pyr}$ is defined as follows $f \oplus [B, (A1,r1), (A2, r2), \ldots, (An,m)](x)$=the m-th largest value of the multiset $Ms = \{rn\nabla f(a) : a \in (An)_x\} \cup \{r(n-1)\nabla f(a) : a \in (A(n-1)\backslash An)_x\} \cup \ldots \cup \{r1\nabla f(a) : a \in (A1\backslash A2)_x\} \cup \{f(b) : b \in (B\backslash A1)_x\}$, Soft Erosion: Let f: $Z^k \Rightarrow Z+$ be a signal and $S_{pyr}=[B, (A1, r1), (A2,r2), \ldots, (An,rn)]$ a hierarchical structuring system. The soft erosion of the signal f by a hierarchical structuring system $S_{pyr}$ is defined as follows $f \otimes [B, (A1,r1), (A2, r2), \ldots, (An,rn)](x)$=the rn-th smallest value of the multiset $Ms = \{rn\nabla f(a) : a \in (An)_x\} \cup \{r(n-1)\nabla f(a) : a \in (A(n-1)/An)_x\} \cup \ldots \cup \{r1\nabla f(a) : a \in (A1\backslash A2)_x\} \cup \{f(b) : b \in (B\backslash A1)_x\}$, In general, soft morphological filters are nonlinear image transformations that locally modify geometric features of images. Soft dilation can be viewed as an operation that expands an original image, while soft erosion can viewed as an operation that shrinks the original image. The L. Koskinen et al. article also describes soft closing and soft opening operations. In general, soft opening is defined as soft erosion followed by soft dilation, while soft closing is defined as soft dilation followed by soft erosion. Both soft closing and soft opening can be viewed as operations which smooth the contours of an input image, typically following soft erosion or dilation of the original image. Since soft dilation and soft erosion are weighted order statistics filters, and thus stack filters, soft closing and soft opening can be viewed as a cascade of stack filters.

Known soft morphological operations provide good techniques for resampling discrete data that overcome some shortcomings of prior techniques, such as interpolation. Known soft morphological methods, however, still suffer from noise in the original image, and other drawbacks.

SUMMARY OF THE INVENTION

Under embodiments of the present invention, a method and a corresponding system employs and improves on soft morphological methods. The method resizes an image $2^m$ times where M is an integer. A moving window having, for example, five pixels, includes a center "hard core" and four surrounding pixels. Two or more structural sets or multiset are applied to the window to produce a set of pixels greater than the set of pixels in the original image. For example, the hard core is repeated three times, while immediately adjacent left and right pixels are repeated twice. Thus, a series of nine pixels results. The resulting nine pixels are then sorted based on descending gray scale levels. The n-th largest pixels is selected, such as the third largest. The image is updated, the window moved, and the method repeats again. The method can be employed in two dimensions to resize a two-dimensional image. A more complex window and multiset can be constructed, such as a 5×5 two-dimensional window, although computational complexity increases.

In a broad sense, an embodiment of the present invention includes an apparatus and corresponding method for resizing a stored image, where the stored image is comprised of a plurality of pixels. The apparatus includes pixel analysis circuitry that retrieves a set of M pixels from the stored image and replicates a first pixel in the set of M pixels j times, and replicates at least a second pixel in the set of M pixels k times. The apparatus sorts the M set of pixels and the replicated pixels, and selects an n-th largest pixel in the sorted pixels. The apparatus stores the selected pixel in the memory, and retrieves another set of M pixels, and again replicates, sorts, selects and stores for another set of M pixels. In an exemplary embodiment, j is greater than k, and j and k are greater than 1.

DETAILED DESCRIPTION OF THE INVENTION

A machine vision system, and in particular, an apparatus and method for resizing images, is described in detail herein. In the following description, numerous specific details are set forth such as specific multisets, pixel selection from a resulting ordered set, images, size changes, etc., in order to provide a thorough understanding of the present invention. One skilled in the relevant art, however, will readily recognize that the present invention can be practiced without certain specific details, or with other such details. In other instances, well-known structures and operations are not shown in detail in order to avoid obscuring the present invention.

Figure 1:
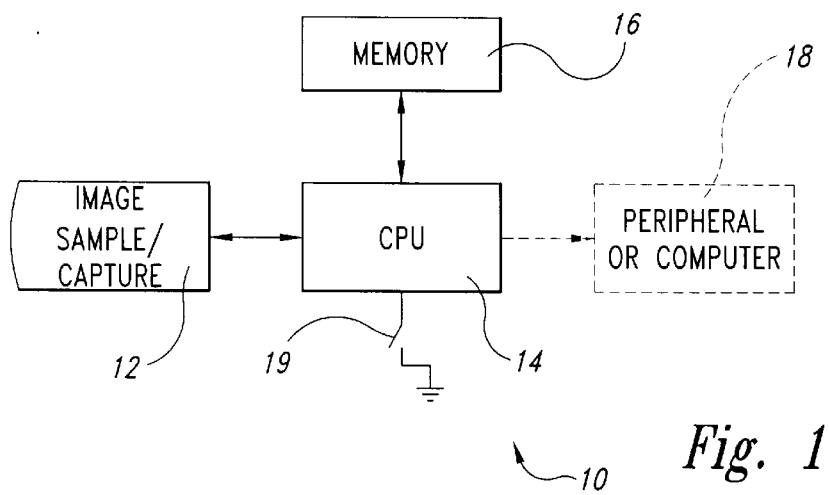
FIG. 1 is a block diagram of a reader under an embodiment of the present invention.

As shown in FIG. 1, an embodiment of the present invention is incorporated in a reader system 10 having an image sampling or capturing device 12. In an exemplary embodiment, the image capture device 12 is an area imager that contains an array of photosensitive elements, preferably a charge-coupled device ("CCD") having, for example, a rectangular active surface of pixel elements. Other known area imagers may be used, such as vidicons, two-dimensional semiconductor arrays or a linear CCD array having mechanical means to pivot the array and provide resolution in an axis perpendicular to the linear axis of the CCD array. Additionally, other sized CCD arrays may be used, for example, circular or square CCD arrays. The pixel element array defines the field of view of the area imager. Appropriate conventional focusing optics, electronics and/or a light source (not shown) are also provided as part of the area imager.

As is known, each pixel element in the CCD array of the area imager outputs a gray level signal, i.e., an analog signal that determines the amount or intensity of light impinging upon the particular pixel element. Alternatively, each pixel element in the CCD array of the area imager can output a signal that indicates the gray intensity value of the particular pixel element. In an exemplary embodiment, each pixel element has an intensity value ranging between 0 and 7, or 0 and 15, ranging between black and white. The signals output from the CCD array are similar to video data. While the exemplary embodiment of the image sample/capture device 12 is an area imager, those skilled in the relevant art will readily recognize that other image sampling or capture devices can be employed such as laser scanners, pen-based readers, etc.

A central processing unit ("CPU") 14 receives the video data signals output from the area imager. The CPU 14 preferably includes an analog-to-digital converter that converts the gray level analog signals from the area imager into digital signals. The CPU 14 also preferably includes a clock operating at a high speed so that the CPU similarly operates at a rapid rate.

A memory 16, coupled to the CPU 14, stores the digital signals output from the CPU. The memory 16 preferably includes both volatile and non-volatile memory (e.g., random access and electronically erasable read only memory). An object or image within the field of view of the area imager is converted into electrical signals that are digitized and stored in the memory 16 to be retrieved and processed by the CPU 14 under the routine described below. After processing the stored image, the CPU 14 can output to a peripheral apparatus or computer 18 the results of such processing. The reader 10 may be a hand-held product and include a trigger switch 19 coupled to the CPU 14. By actuating the trigger switch 19, the CPU 14 causes the area imager to provide image signals to the CPU that constitute the instantaneous image within the field of view of the area imager. The specific means and method for storing an image of a symbol by the reader 10 are conventional and will be understood by those skilled in the relevant art without need for further description herein.

Figure 2:
FIG. 2 is an example of a digitized image stored in a memory of the reader of FIG. 1.

In examples discussed herein, the reader 10 captures and stores an image of a data collection symbol, which can be surrounded by visual information such as alphanumeric characters. FIG. 2 shows an exemplary image captured and stored in the memory 16 of the reader 10. While the image of FIG. 2 is generally rectangular, for simplicity, a square portion of the image having equal x and y pixel densities can be used. Therefore, an embodiment of the present invention reduces original pixel density of 2,500 by 2,500 pixels to 1,100 by 1,100 pixels, as described below.

As used herein, a "data collection symbol" refers to a symbol from any of the linear, stacked, area and other machine-readable symbologies. "Linear" symbologies generally encode data characters as parallel arrangements of multiple width rectangular bars and spaces. Each group of unique pattern of bars and spaces within a predetermined width defines a particular data character. "Stacked symbologies" generally employ several adjacent rows, each row having several characters defined by groups of multiple width bars and spaces. An "area" symbology employs a matrix of data cells rather than one or more rows of bars and spaces. The height and width of each data cell within the matrix are generally equal, and the height and width of the symbol are generally comparable.

Figure 3:
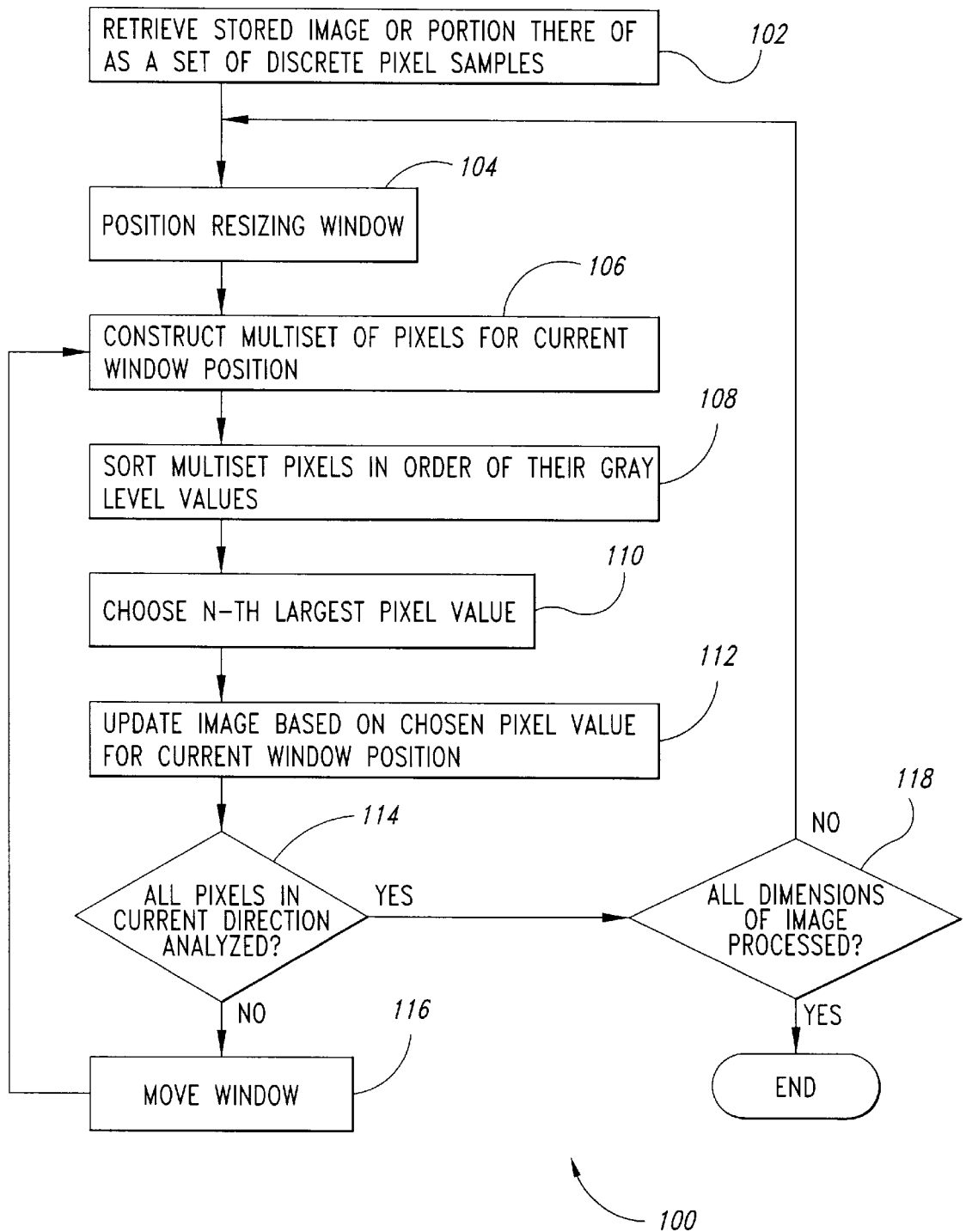
FIG. 3 is a flow diagram of an image resizing method under an embodiment of the present invention.

Referring to FIG. 3, a routine 100, executed by the CPU 14, retrieves and processes an image from the memory 16 of the reader 10. The routine 100 is preferably performed with one or more high-speed CPUs, and in readers having two-dimensional sampling of pixels within a stored image. However, the present invention can also be employed with laser scanner readers, pen-based readers, and other known machine-readable symbol readers. The routine 100, and all the routines and methods described herein, can be permanently stored within the non-volatile memory portion of the memory 16.

The routine 100 begins in step 102, where the CPU 14 retrieves a stored image or portion thereof which is stored in the memory 16. In one embodiment, the CPU 14 in step 102 retrieves only a discrete number of samples or pixels in one of two dimensions. As explained below, the CPU 14 performs the routine 100 twice to alter the pixel density or size of a two-dimensional stored image.

Prior to step 102, the reader 10 produces one or more signals based on light reflected from an object or image, such as a symbol, and stores the signals as an image or partial image of the symbol. As explained herein, various methods and apparatus for receiving light reflected from the symbol and producing signals therefrom are known to those skilled in the art. In an exemplary embodiment, the reader 10 produces an image signal representing the entire symbol and field of view of the reader, which is stored in the memory 16. As used herein, the term "stored image" generally refers to the overall image of the field of view stored in memory 16 that has been produced by the area imager and the CPU 14, and which contains desired data such as the symbol or symbols to be read and/or other information (e.g., human readable characters).

The memory 16 includes for processing efficiency an array of memory locations addressed by the CPU 14 that correspond to and represent the pixels in the field of view of the CCD array. The stored image is referenced by a Cartesian coordinate system so that the location of each pixel is represented by a pair of numbers indicating the horizontal and vertical position of the pixel in the stored image. As a result, the CPU 14 can rapidly access and retrieve selected pixels in the stored image.

Figure 4:
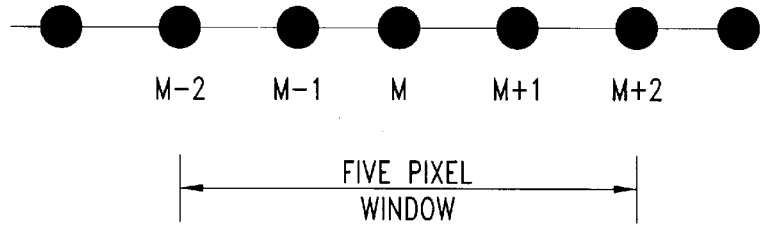
FIG. 4 shows a series of pixels from the image of FIG. 2 and corresponding pixel identification values.

In step 104, the CPU 14 positions a filtering window within the retrieved stored image or a portion thereof. As shown in FIG. 4, the CPU 14 preferably employs a five linear pixel window having a center pixel m, immediately adjacent left and right pixels m−1 and m+1, and left and right pixels m−2 and m+2, respectively. Those skilled in the relevant art will recognize, based on the detailed description provided herein, that other windows can be employed, such as a seven pixel window. Moreover, while the window of FIG. 4 is linear, a two-dimensional window can be employed, such as a 5×5 pixel window. Such a two-dimensional window, however, requires increased processing time.

Figure 5:
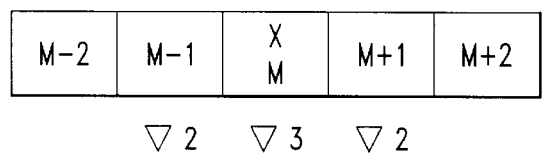
FIG. 5 is an exemplary filtering window.

In step 106, the CPU 14 constructs a multiset of pixels for the current window position. As shown in FIG. 5, structural sets or multisets are applied to the window to produce a number of pixels greater than the original set of pixels within the window. The multiset provides a complex "hard core" where the center pixel m (shown with an "X" in FIG. 5), is repeated three times, while the immediate left and right neighboring pixels are repeated twice (i.e., $3\nabla m$, $2\nabla(m+1, m-1)$). As a result, the five pixel window m−2, m−1, m, m+1 and m+2 is transformed under the multiset to the following series of pixels: m−2, m−1, m−1, m, m, m, m+1, m+1, m+2. For example, if a series of pixels in a window have gray scale values 8, 6, 7, 3 and 1 for the pixel locations m−2, m−1, m, m+1 and m+2, respectively, the CPU is step 106 constructs the following series of pixels: 8, 6, 6, 7, 7, 7, 3, 3, 1. Other complex multisets for the filtering window are possible. For example, the center pixel m can be repeated four times, while immediately adjacent left and right pixels are repeated only twice (i.e., $4\nabla m$, $2\nabla(m+1, m-1)$).

In step 108, the CPU 14 sorts the resulting series of nine pixels in order of their gray level values. Under the above example, the CPU 14 sorts the series of nine pixels in descending gray scale value to produce the series: 8, 7, 7, 7, 6, 6, 3, 3, 1. Of course, the original 5 and 4 repeated pixels can be sorted in other fashions, such as in ascending gray scale values, etc.

In step 110, the CPU 14 chooses an n-th largest pixel value in the sorted series of pixel values. The value of n can be based on several predetermined factors, such as image quality. In the exemplary embodiment, the CPU 14 employs the third largest pixel value (i.e., n=3). Under the above example, the third largest pixel value is 7. If the stored image is bright, then a lower n value is employed to compensate for such a bright image (e.g., a sixth pixel out of the nine with a gray scale range between 7 (white) and 0 (black)). Alternatively, if the stored image has good resolution and good dynamic range (difference between bright and dark pixel values), then a middle pixel can be selected (e.g., a third or fourth pixel from the series of nine in a range of pixel values between 0 and 15). The CPU 14 can dynamically and automatically select a value of n based on a stored image, for example, by determining a mean gray scale value for the image to determine its brightness. Other factors can be used to determine which pixel is selected from the sorted series of pixels, such as a middle of the dynamic range of the image, a deviation from a mean gray scale value.

By employing a complex hard core and selecting an appropriate n-th value from an ordered series of resulting pixel values, the embodiment of the present invention preserves some gray scale values. Additionally, the embodiment of the present invention preserves the dynamic range of the image, which is an improvement over prior convolution techniques which can create artificial gray scale values.

In step 112, the CPU 14 updates the stored image based on the n-th largest pixel value chosen for the current window position. In other words, the CPU 14 replaces the pixel value for pixel location m with the n-th largest pixel value chosen under previous step 110. Thus, five pixels (in filtering window) are used to produce one final pixel (i.e., the center pixel m).

Importantly, the embodiment of the present invention can filter noise from an image. For example, if a window contains the series of pixels 6, 7, 2, 6, 8 for pixel positions m−2, m−1, m, m+1 and m+2, respectively, a constructed multiset for such series of pixels is: 6, 7, 7, 2, 2, 2, 6, 6, 8. In this example, the pixel value 2 in the center representing a dark pixel, which is surrounded by lighter pixels, is assumed to be noise or a spurious dark pixel. A sorting of the series of pixels under step 108 produces the series of pixels 8, 7, 7, 6, 6, 6, 2, 2, 2. The CPU 14 in step 1 10 then selects the third largest pixel value, which is 7. Thus, the spurious center pixel m having a value of 2 is ignored and replaced.

In step 114, the CPU 14 determines whether all pixels in the current direction have been analyzed. If not, then in step 116, the CPU 14 moves the window to a new location in the current direction. For example, if the CPU 14 initially analyzes a horizontal row of pixels in the stored image, the CPU 14 moves the window horizontally from the current position (e.g., left to right). After analyzing a first horizontal row of pixels in the stored image, the CPU continues by analyzing subsequent horizontal rows of pixels, left to right, under steps 106–116. If the stored image is simply to be filtered, and not resized, then the window moves at one pixel increments. However, if the image is to be resized, e.g., reduced to a smaller size, then the window jumps or moves so as to skip pixels. For example, after performing steps 106–114, the CPU 14 in step 116 moves the window two pixels rightward. Therefore, center pixel m now becomes previous pixel m+2, thereby skipping m+1. As a result, the stored image is reduced by about 50%.

The CPU 14 could also employ pyramid filtering or other methods to reduce a number of pixels. As is known, filters with pyramidal coefficients are robust tools for image reduction and the extraction of bandwidth information. Under an alternative embodiment of the present invention, the CPU 14 can employ a pyramid filtering routine having a resolution step equal to 2. In other words, five pixel values are employed in the window to produce one final pixel value as noted above. Thereafter, two pixels are skipped, and the next five intermediate discrete pixel values are employed in to produce a second final pixel value, etc. Pyramid filtering preferably employs predetermined coefficients to improve filtering. Further details regarding pyramid filtering are discussed in the inventors' U.S. patent application Ser. No. 08/821,901, filed Mar. 21, 1997, entitled "Method and Apparatus for Changing or Mapping Video or Digital Images From One Image Density to Another," incorporated by reference herein.

After performing steps 106–116, the CPU 14 eventually determines under step 114 that all pixels in the current direction have been analyzed. Thereafter, in step 118, the CPU 14 determines whether all dimensions of the image have been processed. If not, the CPU 14 begins analyzing pixels in a vertical direction as individual columns of pixels. Therefore, the CPU 14 begins in step 104 by positioning the filtering window in a vertical direction at a top of a first column of pixels and again performs steps 104 through 116 as the CPU analyzes the columns of pixels in the stored image. As a result, the CPU can resize images in $2_M$ times, where M is an integer. To resize a two-dimensional image twice, the CPU 14 employs the steps 106 through 116 in horizontal and vertical directions, respectively. To resize an image four times, the CPU 14 first employs the steps 106 through 116 to produce an initial, intermediately resized image (reduced by, e.g., 50%), and then again perform steps 106 through 116 to produce a final image (again reduced by, e.g., 50%, or 75% reduction overall).

Pyramid filtering, as well as the pixel skipping technique discussed above, can only resize images $2^M$ times. To resize an image from, e.g., 2500 pixels to 2200 pixels, such techniques cannot be used. Instead, convolution techniques must be employed to produce intermediate pixel values. Therefrom, the above pyramid filtering and other techniques can be used to produce images having a size different from $2^M$ times. Further details regarding convolution interpolation are described in the above-referenced patent application. Therefore, by employing convolution interpolation with the embodiments of the invention described herein, alternate image resizing resolutions can be obtained.

Figure 6:
FIG. 6 is an example of a reduced size digital image resulting from an embodiment of the present invention applied to the image of FIG. 2.
Figure 7:
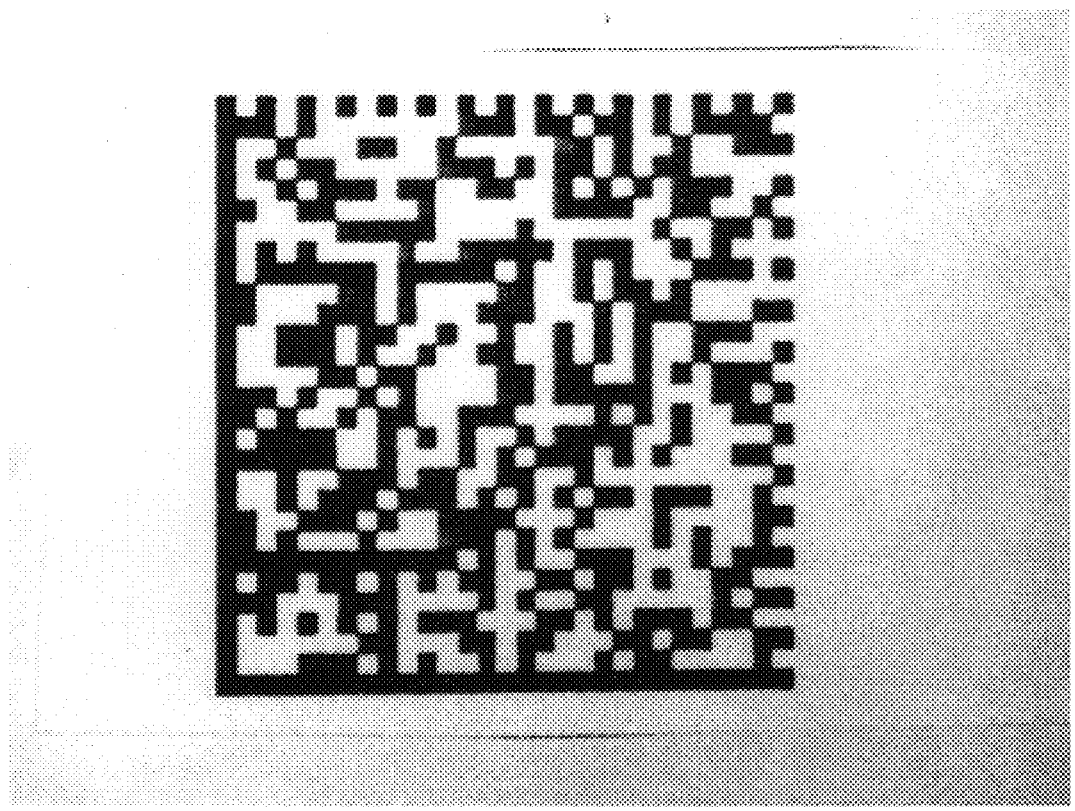
FIG. 7 is another example of a digitized image stored in the memory of the reader of FIG. 1.
Figure 8:
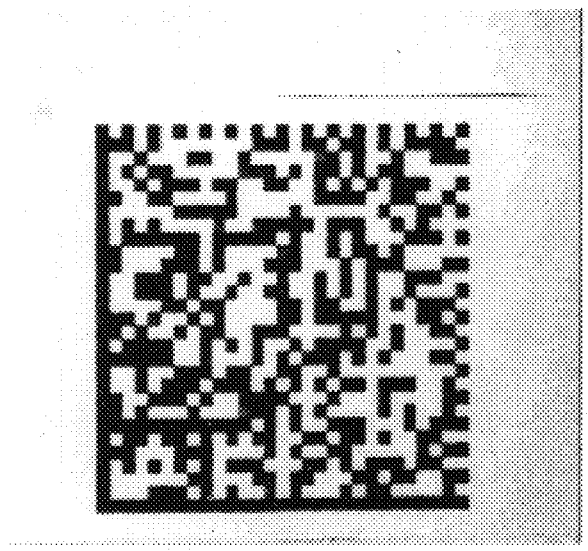
FIG. 8 is an example of a reduced size digital image resulting from an embodiment of the present invention applied to the image of FIG. 7.
Figure 9:
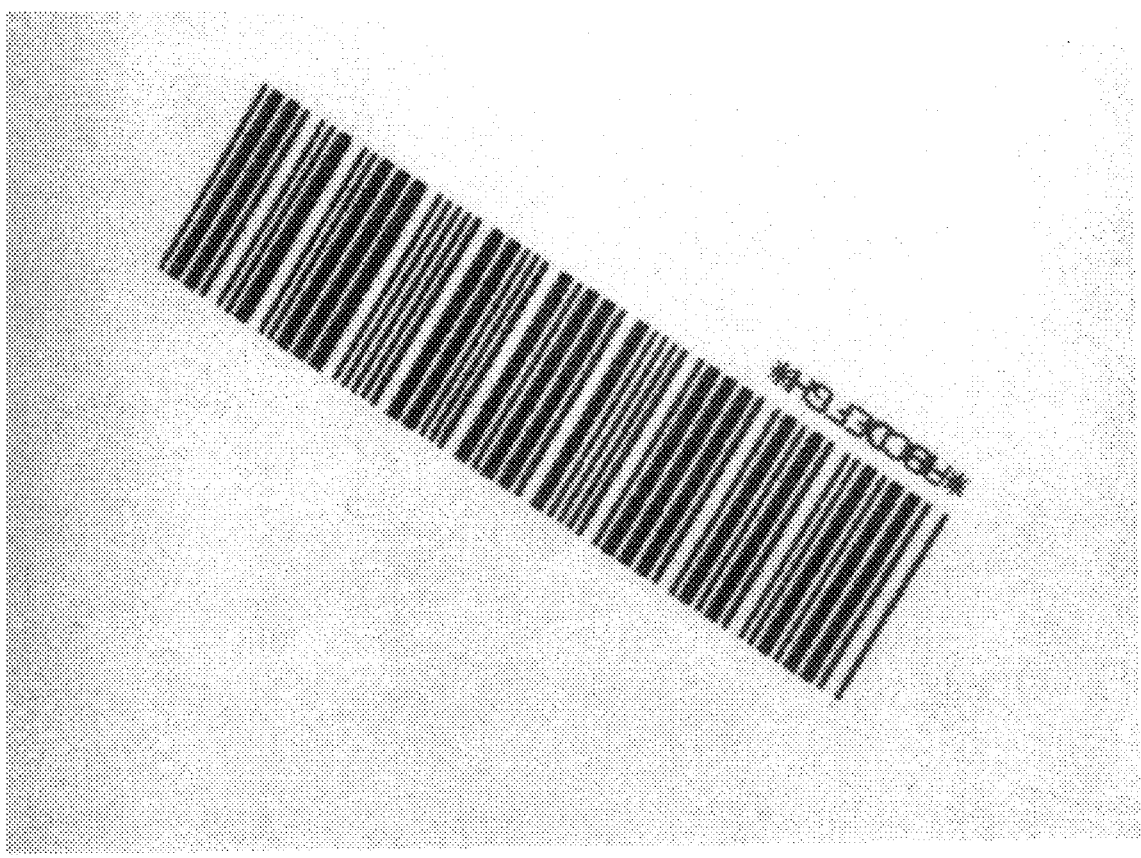
FIG. 9 is another example of a digitized image stored in the memory of the reader of FIG. 1.
Figure 10:
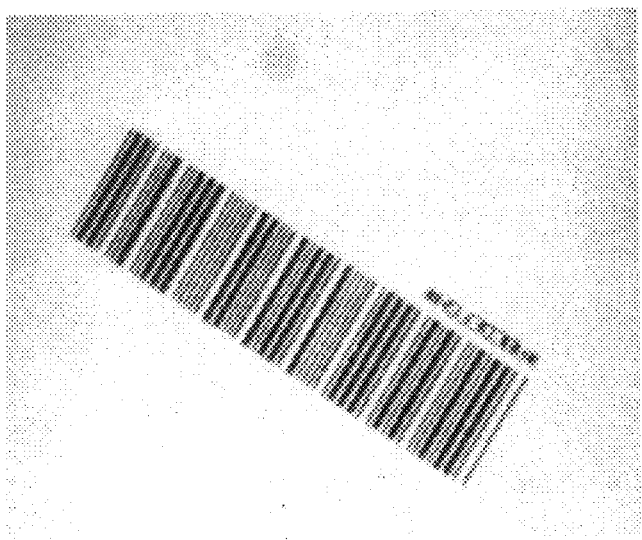
FIG. 10 is an example of a reduced size digital image resulting from an embodiment of the present invention applied to the image of FIG. 9.

FIG. 6 shows an exemplary digital image resulting from the routine 100 as it reduces the original image of a PDF417 symbol and alphanumeric text in FIG. 2. FIG. 7 shows an original data matrix symbol, while FIG. 8 shows an exemplary digital image resulting from the routine 100 as it reduces the original image of FIG. 7. Likewise, FIG. 9 shows an original stored image of a linear bar code symbol and associated alphanumeric text, while FIG. 10 shows a resulting digital image from the routine 100 as it reduces the original image of FIG. 9.

As noted above, a two-dimensional filtering window can be employed, such as a five pixel by five pixel window. The center pixel can be replicated three times, while the eight surrounding pixel values can be replicated twice and the outer 16 pixel values replicated only once. Such an alternative embodiment can preserve structures in the image, such as keeping all lines having an orientation of 45 degrees. Other analysis windows can be employed, such as cross-shaped windows, etc.

Figure 11:
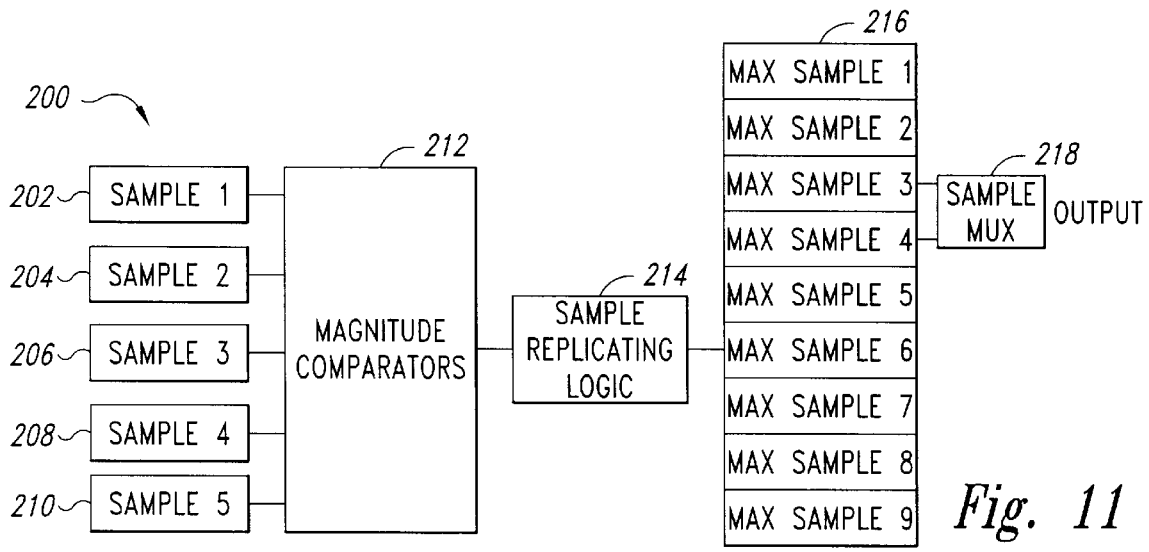
FIG. 11 is a block diagram of an alternative or additional embodiment of an image resizer.

As shown in FIG. 11, an alternative embodiment under the present invention employs an image processing or pixel analysis circuit 200 that performs operations similar to several steps in the routine 100 of FIG. 3. This alternative embodiment, and those described herein, are substantially similar to previously described embodiments, and common steps, functions or elements are identified by the same reference numbers. Only the significant differences in operation are described in detail.

The analysis circuit 200 includes five sample storage elements 202–210 that store five consecutive pixel values therein. The storage elements 202–210 correspond to a five pixel window. The CPU 14 or appropriate clocking circuitry, sequentially inputs a series of five pixels from the stored image into storage elements 202–210.

A magnitude comparator 212 determines a magnitude of each sample as compared the other samples in the storage elements 202–210. In other words, the magnitude comparator 212 determines an order of the samples, from highest gray scale value to lowest. Sample replication logic 214 replicates the five samples based on structural sets or multisets. For example, the third sample in storage element 206 is replicated three times, while the second and fourth samples in storage elements 204 and 208 are replicated twice. Sample replicating logic 214 then stores the replicated samples in descending value order in a series of nine ordered memory elements 216. For example, if the magnitude comparator 212 determines that the second sample in storage element 204 has the largest magnitude, the replicating logic 214, which replicates the sample twice, stores the two samples in the first and second memory elements 216. Subsequent order samples are then stored in decreasing order in the remaining memory elements 216.

A sample multiplexer 218 selects one of the n-th largest samples stored in the memory elements 216. For example, the sample multiplexer 218 selects the third or fourth largest sample stored in the memory elements 216. Whether the third or fourth largest sample stored in the memory elements 216 is selected by the sample multiplexer 218 is predetermined based on the criteria discussed herein, such as image quality. The analysis circuit 200 can form part of the reader 10 to provide rapid processing of image data, such as machine-readable data. The CPU 14 can provide appropriate control and clocking signals to the analysis circuit 200.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other machine vision systems, not necessarily the exemplary data collection symbology reader generally described above. Additionally, while the present invention has generally been described above as reducing the size of a digital image, the present invention can be employed to increase the size of an image, or to filter an image without resizing. Furthermore, while the present invention has generally been described above as altering the size of a one- or two-dimensional image, a three-dimensional image (typically composed of a series of two-dimension images) or four-dimensional data can be altered under embodiments of the present invention.

These and other changes can be made to the invention in light of the above detailed description. In general, in the following claims, the terms used should not be construed to limit the invention to the specific embodiments disclosed in the specification and the claims, but should be construed to include all machine vision systems that operate in accordance with the claims to provide a method for processing stored or digital images. Accordingly, the invention is not limited by the disclosure, but instead its scope is to be determined entirely by the following claims.

What is claimed is:

1. Bar code reading apparatus for imaging a data collection symbol representing encoded information, the apparatus comprising:
    a sensor that receives light reflected from the symbol and produces an output signal therefrom that represents the reflectance of the bars and spaces of the symbol;
    a memory for storing at least a portion of an image of the symbol, the stored image being comprised of pixels in at least one dimension, each pixel having an intensity value; and
    image processing circuitry that retrieves a set of M pixels from the memory and applies an M-pixel sized window to the set of M pixels, replicates a first pixel in the set of M pixels in the window j times and replicates at least a second pixel in the set of M pixels in the window k times, sorts the M set of pixels and replicated pixels, selects an n-th largest pixel in the sorted pixels where the n-th largest pixel is not a largest pixel in the sorted pixels, stores the selected pixel in the memory, and repeatedly retrieves another set of M pixels and again replicates, sorts, selects and stores for the another set of M pixels to generate a reduced size image based on the stored image, and wherein j is greater than k, and j and k are greater than one.

2. The apparatus of claim 1 wherein the image processing circuitry includes:
    a plurality of storage elements for storing the set of M pixels from the memory;
    magnitude comparator circuitry coupled to the plurality of storage elements that compares magnitudes of pixel values;
    replicating logic coupled to replicate selected pixels in the stored set of M pixels;
    an ordered set of memory elements coupled to the replicating logic that stores the set of M pixels and the replicated pixels in order of magnitude; and
    a multiplexing circuit coupled to the ordered set of memory elements that outputs an n-th largest magnitude pixel stored in the ordered set of memory elements.

3. The apparatus of claim 1 wherein the image processing circuitry includes a microprocessor that is programmed to retrieve, replicate, sort, select and store pixels.

4. The apparatus of claim 1 wherein the image processing circuitry is configured to retrieve a set of first, second, third, fourth and fifth adjacent pixels positioned along a row of the stored image, and to replicate the third pixel three times and the second and fourth pixels twice.

5. The apparatus of claim 1 wherein the image processing circuitry is configured to sort the M set of pixels and replicated pixels in descending order of intensity, determine a quality of the stored image, determine a value for n, and then select the n-th largest pixel in the sorted pixels.

6. The apparatus of claim 1 wherein the stored image includes rows of pixels, and wherein the image processing circuitry retrieves, replicates, sorts, selects and stores for each row of pixels in the stored image to produce an intermediate image having a reduced number of pixels from the stored image, and then retrieves, replicates, sorts, selects and stores rows of pixels in the intermediate image to produce a final image having a reduced number of pixels from the intermediate image.

7. The apparatus of claim 1 wherein the image processing circuitry is configured to pyramid filter the stored image to produce a final image having fewer pixels than the stored image.

8. An apparatus for processing a stored image, the stored image being comprised of a plurality of pixels and at least a portion of the image being stored in a memory, the apparatus comprising pixel analysis circuitry that retrieves a set of M pixels from the stored image and applies an M-pixel sized window to the set of M pixels, replicates a first pixel in the set of M pixels in the window j times and replicates at least a second pixel in the set of M pixels in the window k times, sorts the M set of pixels and replicated pixels, selects an n-th largest pixel in the sorted pixels where the n-th largest pixel is not a largest pixel in the sorted pixels, stores the selected pixel in the memory, and retrieves another set of M pixels and again replicates, sorts, selects and stores for the another set of M pixels to generate a reduced size image based on the stored image, and wherein j is greater than k, and j and k are greater than one.

9. The apparatus of claim 8 wherein the pixel analysis circuitry includes:
    magnitude comparator circuitry coupled to receive a set of M pixels from the memory and compare magnitudes of pixel values;
    replicating logic coupled to replicate selected pixels in the set of M pixels;
    a series of memory elements coupled to the replicating logic that stores the set of M pixels and the replicated pixels in magnitude order; and an output circuit coupled to the memory elements that outputs an n-th largest magnitude pixel stored in the memory elements.

10. The apparatus of claim 8 wherein the pixel analysis circuitry includes a microprocessor that is programmed to retrieve, replicate, sort, select and store pixels.

11. The apparatus of claim 8 wherein the pixel analysis circuitry is configured to retrieve a two-dimension set of adjacent pixels as a window from the stored image, and to replicate a center pixel j times and replicate pixels immediately surrounding the center pixel k times.

12. The apparatus of claim 8 wherein the pixel analysis circuitry is configured to sort the M set of pixels and replicated pixels in descending order of intensity, determine a quality of the stored image, determine a value for n, and then select the n-th largest pixel in the sorted pixels.

13. The apparatus of claim 8 wherein the stored image includes rows and columns of pixels, and wherein the pixel analysis circuitry retrieves, replicates, sorts, selects and stores for each row of pixels in the stored image to produce an intermediate image having a reduced number of pixels from the stored image, and then retrieves, replicates, sorts, selects and stores rows of pixels in the intermediate image to produce a final image having a reduced number of pixels from the intermediate image.

14. The apparatus of claim 8 wherein the stored image includes rows and columns of pixels, and wherein the pixel analysis circuitry retrieves, replicates, sorts, selects and stores for each row of pixels in the stored image, and then retrieves, replicates, sorts, selects and stores for each column of pixels in the stored image.

15. The apparatus of claim 8 wherein the pixel analysis circuitry pixel reduction filtering of the stored image to produce a final image having fewer pixels than the stored image.

16. A method of reducing the size of a stored image comprising:
storing an image, the image being comprised of a plurality of pixels;
retrieving a set of M pixels from the memory and applying an M-pixel sized window to the M set of pixels;
replicating a first pixel in the set of M pixels in the window j times and replicating at least a second pixel in the set of M pixels in the window k times;
sorting the M set of pixels and replicated pixels;
selecting an n-th largest pixel in the sorted pixels, wherein the n-th largest pixel is not a largest pixel in the sorted pixels;
storing the selected pixel in the memory;
repeatedly retrieving another set of M pixels and again performing the replicating, sorting, selecting and storing for the another set of M pixels, and wherein j is greater than k, and j and k are greater than one; and
generating a reduced size image based on the stored image and the acts of retrieving, replicating, sorting, selecting, storing and repeatedly retrieving the selected pixel.

17. The method of claim 16 wherein the selecting includes alternatively selecting the n-th largest pixel and a (n−1)-th pixel.

18. The method of claim 16 wherein the choosing includes retrieving a set of first, second, third, fourth and fifth adjacent pixels positioned along a row of the stored image, and wherein the replicating includes replicating the third pixel three times and the second and fourth pixels twice.

19. The method of claim 16 wherein the sorting includes sorting the M set of pixels and replicated pixels in descending order of intensity, and wherein the selecting includes determining a quality of the stored image, determining a value for n, and then selecting the n-th largest pixel in the sorted pixels.

20. The method of claim 16 wherein the stored image includes rows of pixels, and wherein the retrieving, replicating, sorting, selecting and storing are performed for each row of pixels in the stored image to produce an intermediate image having a reduced number of pixels from the stored image, and then the retrieving, replicating, sorting, selecting and storing are performed for rows of pixels in the intermediate image to produce a final image having a reduced number of pixels from the intermediate image.

21. The method of claim 16 wherein the stored image includes rows and columns of pixels, and the retrieving, replicating, sorting, selecting and storing are performed for each row of pixels in the stored image, and then the retrieving, replicating, sorting, selecting and storing are performed for each column of pixels in the stored image.

22. The method of claim 16, further comprising the pyramid filtering the stored image to produce a final image having fewer pixels than the stored image.

23. The method of claim 16 wherein the acts are performed in the order of: retrieving, replicating, sorting, selecting and storing.

24. A computer implemented method of processing a stored image, the stored image being comprised of a plurality of pixels, the method comprising:
choosing a set of M pixels from the memory and applying an M-pixel sized window to the M set of pixels;
replicating a first pixel in the set of M pixels in the window j times and replicating at least a second pixel in the set of M pixels in the window k times;
sorting the M set of pixels and replicated pixels;
selecting an n-th largest pixel in the sorted pixels, wherein the n-th largest pixel is not a largest pixel in the sorted pixels;
storing the selected pixel in the memory;
repeatedly choosing another set of M pixels and again performing the replicating, sorting, selecting and storing for the another set of M pixels, and wherein j is greater than k, and j and k are greater than one, and generating a reduced size image based on the stored image and the acts of choosing, replicating, sorting, selecting, storing and repeatedly choosing.

25. The method of claim 24 wherein the selecting includes alternatively selecting the n-th largest pixel and a (n−1)-th pixel.

26. The method of claim 24 wherein the choosing includes retrieving a two-dimension set of adjacent pixels as a window from the stored image, and wherein the replicating includes replicating a center pixel j times and replicate pixels immediately surrounding the center pixel k times.

27. The method of claim 24 wherein the sorting includes sorting the M set of pixels and replicated pixels in descending order of intensity, and wherein the selecting includes determining a quality of the stored image, determining a value for n, and then selecting the n-th largest pixel in the sorted pixels.

28. The method of claim 24 wherein the stored image includes rows of pixels, and wherein the choosing, replicating, sorting, selecting and storing are performed for each row of pixels in the stored image to produce an intermediate image having a reduced number of pixels from the stored image, and then the choosing, replicating, sorting, selecting and storing are performed for rows of pixels in the intermediate image to produce a final image having a reduced number of pixels from the intermediate image.

29. The method of claim 24 wherein the stored image includes rows and columns of pixels, and the choosing, replicating, sorting, selecting and storing are performed for each row of pixels in the stored image, and then the choosing, replicating, sorting, selecting and storing are performed for each column of pixels in the stored image.

30. The method of claim 24, further comprising filtering the stored image to produce a final image having fewer pixels than the stored image.

31. The method of claim 24 wherein the acts are performed in the order of: choosing, replicating, sorting, selecting and storing.

32. The method of claim 24 wherein the choosing includes retrieving a cross-shaped, two-dimensional set of adjacent pixels as a window from the stored image.

33. The method of claim 24 further comprising the cubic convolution interpolating at least a portion of the plurality of pixels of the stored image.

34. A computer-readable medium containing instructions for causing a computer system to resize a stored image, the stored image being comprised of a plurality of pixels, the instructions causing the computer to perform a method comprising:

choosing a set of M pixels from the memory and applying an M-pixel sized window to the M set of pixels;

replicating a first pixel in the set of M pixels in the window j times and replicating at least a second pixel in the set of M pixels in the window k times;

sorting the M set of pixels and replicated pixels;

selecting an n-th largest pixel in the sorted pixels, wherein the n-th largest pixel is not a largest pixel in the sorted pixels;

storing the selected pixel in the memory;

repeatedly choosing another set of M pixels and again performing the replicating, sorting, selecting and storing for the another set of M pixels, and wherein j is greater than k, and j and k arc greater than one; and generating a reduced size image based on the stored image and the acts of choosing, replicating, sorting, selecting, storing and repeatedly choosing.

* * * * *